(12) United States Patent
Kuge et al.

(10) Patent No.: US 8,494,714 B2
(45) Date of Patent: Jul. 23, 2013

(54) STABILITY DISPLAY APPARATUS

(75) Inventors: Nobuyuki Kuge, Zushi (JP); Takayuki Kondoh, Machida (JP); Yoshiki Yasuno, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 14 days.

(21) Appl. No.: 13/198,859

(22) Filed: Aug. 5, 2011

(65) Prior Publication Data
US 2012/0041641 A1    Feb. 16, 2012

(30) Foreign Application Priority Data
Aug. 10, 2010   (JP) ................................. 2010-179733

(51) Int. Cl.
*G06F 7/00*   (2006.01)

(52) U.S. Cl.
USPC .......... 701/36; 701/1; 701/48; 701/70; 705/1; 303/140; 303/146; 340/576; 345/690; 123/403; 123/676; 180/197; 250/221; 280/806; 455/41.2; 477/97

(58) Field of Classification Search
USPC ............... 701/1, 48, 70; 705/1; 303/140, 146; 340/576; 345/690; 123/403, 676; 180/197; 250/221; 280/806; 455/41.2; 477/97
See application file for complete search history.

(56) References Cited

U.S. PATENT DOCUMENTS

| 5,707,120 | A | * | 1/1998 | Monzaki et al. | 303/146 |
| 5,727,853 | A | * | 3/1998 | Monzaki | 303/140 |
| 5,845,627 | A | * | 12/1998 | Olin et al. | 123/676 |
| 5,927,421 | A | * | 7/1999 | Fukada | 180/197 |
| 5,928,302 | A | * | 7/1999 | Fukada | 701/70 |
| 5,956,014 | A | * | 9/1999 | Kuriyama et al. | 345/690 |
| 2001/0056317 | A1 | * | 12/2001 | Nishizaki et al. | 701/48 |
| 2003/0055674 | A1 | * | 3/2003 | Nishiyama | 705/1 |
| 2005/0199786 | A1 | * | 9/2005 | Yoshida et al. | 250/221 |
| 2006/0173584 | A1 | * | 8/2006 | Einig et al. | 701/1 |
| 2006/0255956 | A1 | * | 11/2006 | Arakawa et al. | 340/576 |
| 2008/0078356 | A1 | * | 4/2008 | Akagawa | 123/403 |
| 2008/0182715 | A1 | * | 7/2008 | Dickinson | 477/97 |
| 2008/0185831 | A1 | * | 8/2008 | Odate | 280/806 |
| 2009/0270034 | A1 | * | 10/2009 | Suzuki | 455/41.2 |

FOREIGN PATENT DOCUMENTS

JP    2008-152438    8/2001

* cited by examiner

*Primary Examiner* — James Trammell
*Assistant Examiner* — Sanjeev Malhotra
(74) *Attorney, Agent, or Firm* — Young Basile

(57) ABSTRACT

Disclosed herein are stability display apparatus and methods. One apparatus comprises a driving state detection unit configured to detect a driving state of a vehicle in operation; a controller comprising an instability estimation unit configured to estimate an instability index indicating driving instability of the vehicle based on the driving state of the vehicle detected by the driving state detection unit and configured to determine changes in the instability index; and a display unit configured to display the instability index estimated by the instability estimation unit in a display region within a range less than or equal to an upper limit that is a limit of display and configured to display in the display region a representation of the changes of the instability index when the instability index is beyond the upper limit.

8 Claims, 15 Drawing Sheets

US 8,494,714 B2

STABILITY DISPLAY APPARATUS

CROSS REFERENCE TO RELATED APPLICATION

This application claims priority to Japanese Patent Application No. 2010-179733 filed on Aug. 10, 2010 and incorporated herein by reference in its entirety.

TECHNICAL FIELD

The present invention relates to a stability display apparatus that displays information regarding driving stability of a vehicle in operation.

BACKGROUND

In Japanese Unexamined Patent Application Publication No. 2008-152438, awake levels, determined from the degree of monotonicity of how monotonous the driver's operation of operating pedals or shifting gears is or from the frequency of occurrence of erratic driving behaviors of a vehicle resulting from unstable steering, are sequentially stored and displayed as a time-series bar chart. When the current awake level is lower than a certain level, the apparatus alerts the driver via a sound indicator or the like.

In the technology described in Japanese Unexamined Patent Application Publication No. 2008-152438, information regarding the awake level of a driver is displayed as a bar chart. Thus, for a low awake level of which the driver needs to be alerted, no graph such as bar chart is displayed. It is therefore difficult to accurately inform the driver of the tendency of his/her driving state until a sound-based alert or the like has been issued.

That is, it is difficult to accurately inform a driver of information regarding driving stability.

BRIEF SUMMARY

Accordingly, it is an object of the embodiments herein to more accurately inform a driver of information regarding driving stability.

In an aspect disclosed herein, a stability display apparatus displays an index indicating driving instability of a vehicle driven by a driver in a display region within a range less than or equal to an upper limit that is a limit to display. Changes of the index indicating instability, which are beyond the upper limit, are displayed in the display region of a display unit.

According to an aspect disclosed herein, driving instability of a vehicle driven by a driver is estimated using an index indicating driving instability, and changes of the index beyond the upper limit for display in a display region are displayed in the display region.

Disclosed herein are stability display apparatus and methods. One apparatus comprises a driving state detection unit configured to detect a driving state of a vehicle in operation; a controller comprising an instability estimation unit configured to estimate an instability index indicating driving instability of the vehicle based on the driving state of the vehicle detected by the driving state detection unit and configured to determine changes in the instability index; and a display unit configured to display the instability index estimated by the instability estimation unit in a display region within a range less than or equal to an upper limit that is a limit of display and configured to display in the display region a representation of the changes of the instability index when the instability index is beyond the upper limit.

One method comprises detecting a driving state of a vehicle driven by a driver; estimating an instability index indicating driving instability of the vehicle driven by the driver on the basis of the driving state of the vehicle; estimating changes in the instability index; displaying the instability index in a display region within a range less than or equal to an upper limit that is a limit of display; and displaying in the display region a representation of the changes of the instability index which are beyond the upper limit.

Therefore, the driver can be informed of the changes of the index indicating instability by using a display region. and can be more accurately informed of information regarding driving stability.

BRIEF DESCRIPTION OF THE DRAWINGS

The description herein makes reference to the accompanying drawings wherein like reference numerals refer to like parts throughout the several views, and wherein.

DETAILED DESCRIPTION

A vehicle according to an embodiment herein will be described hereinafter with reference to the drawings.

Figure 1:
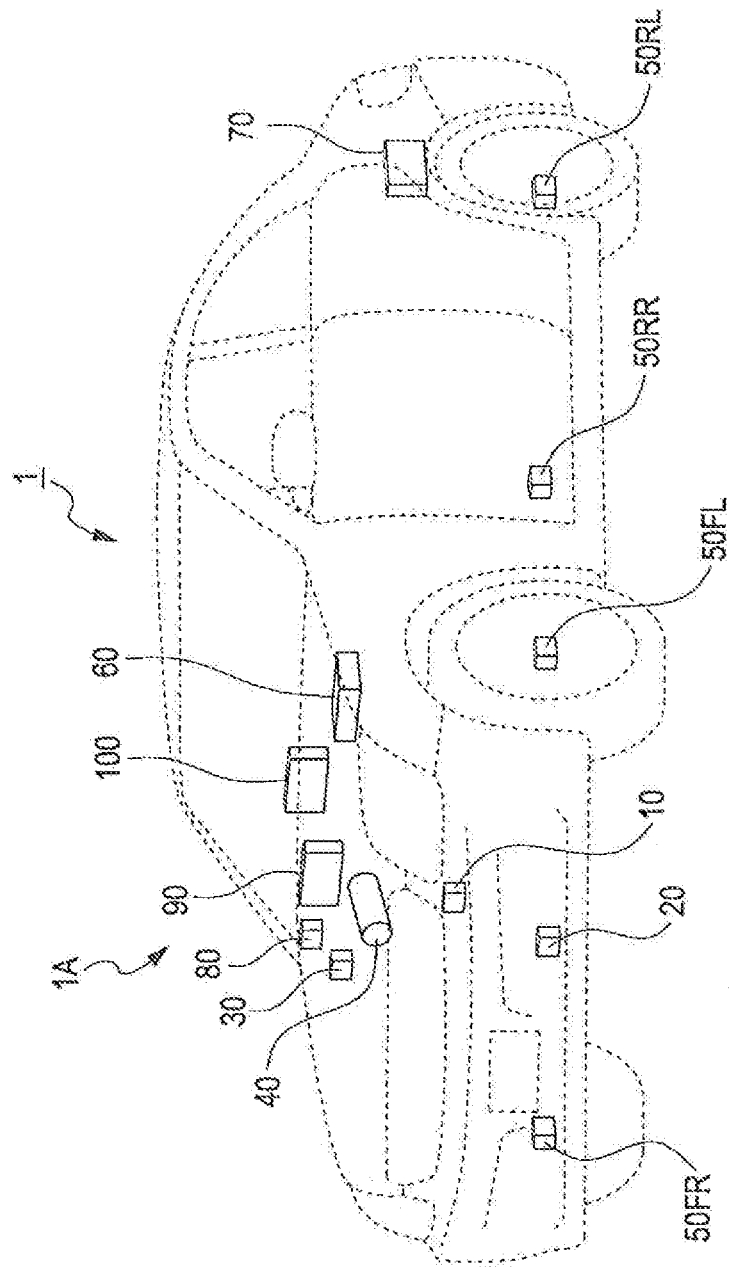
FIG. 1 is a schematic diagram illustrating the configuration of a motor vehicle according to a first embodiment.
Figure 2:
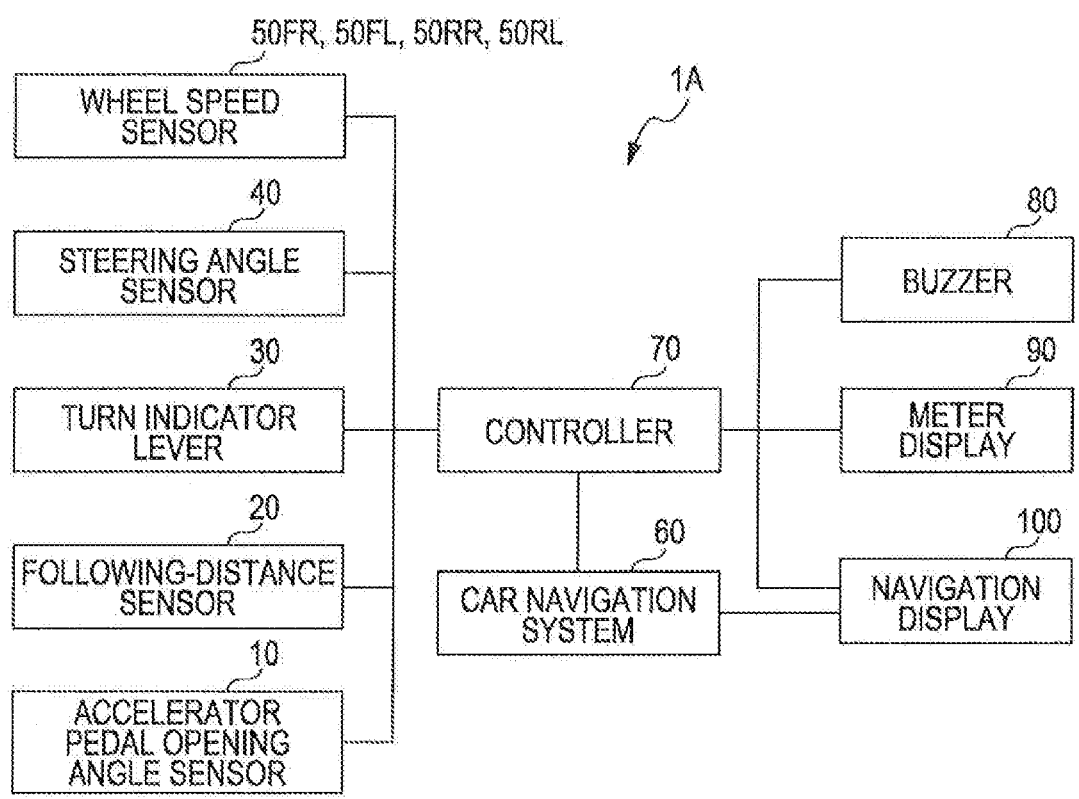
FIG. 2 is a system configuration diagram illustrating a stability display apparatus provided in the motor vehicle.

Referring to FIGS. 1 and 2, the motor vehicle 1 includes an accelerator pedal opening angle sensor 10, a following-distance sensor 20, a turn indicator lever 30, a steering angle sensor 40, wheel speed sensors 50FR, 50FL, 50RR, and 50RL, a car navigation system 60, a controller 70, a buzzer 80, a meter display 90, and a navigation display 100.

The accelerator pedal opening angle sensor 10 detects the accelerator pedal opening angle corresponding to the amount of accelerator pedal depression, and outputs a signal indicating the detected accelerator pedal opening angle to the controller 70.

The following-distance sensor 20 measures the distance (following distance) between the vehicle (the motor vehicle 1) and the vehicle in front using an ultrasonic system, a millimeter wave system, or the like, and outputs a signal indicating the measured following distance to the controller 70.

The turn indicator lever 30 may be a lever operated by a driver for indicating a turning maneuver. In accordance with a turning maneuver to the right or left, the turn indicator lever 30 outputs a signal indicating the direction of the turning maneuver to the controller 70.

The steering angle sensor 40 detects the rotation of a steering shaft as a steering angle, and outputs a signal indicating the steering angle to the controller 70.

The wheel speed sensors 50FR, 50FL, 50RR, and 50RL output pulse signals indicating the rotational speeds of the respective wheels to the controller 70.

The car navigation system 60 includes a global positioning system (GPS), a vehicle information and communication system (VICS), and a map database system. The car navigation system 60 obtains the current position of the vehicle, the current time, and road traffic information, or provides navigation information including a movement path to a destination and facilities on the way to the destination, such as service areas and stores. The car navigation system 60 allows navigation information such as the current position or a movement path on a map to be displayed on the navigation display 100 or outputs the navigation information to the controller 70.

The signals from the accelerator pedal opening angle sensor 10, the following-distance sensor 20, the turn indicator lever 30, the steering angle sensor 40, the wheel speed sensors 50FR, 50FL, 50RR, and 50RL, and the car navigation system 60 are input to the controller 70. The controller 70 executes a driving state display process described below on the basis of the above signals, and provides the driver with information regarding driving stability.

Specifically, the controller 70 may be a microcomputer including a central processing unit (CPU), a memory, and a read only memory (ROM), and controls the overall operation of the motor vehicle 1. Further, the controller 70 stores a driving state display processing program for performing a driving state display process in the ROM. When the ignition is on, the controller 70 reads the driving state display processing program stored in the ROM, by using the CPU, and repeatedly executes the driving state display process while storing various data in the memory.

The controller 70 causes the processing result of the driving state display process to be displayed on the navigation display 100 or to be output as sound from the buzzer 80.

The motor vehicle 1 also includes various sensors such as a brake-pedal depression amount sensor and an acceleration sensor although not illustrated in FIG. 1. Detection signals detected by the sensors are input to the controller 70.

The buzzer 80 may be a device that emits sound in accordance with an instruction signal of the controller 70.

The meter display 90 may be a display provided on an instrument panel of the motor vehicle 1, and displays the vehicle speed, the rotational speed of the engine, a fuel gauge indication, an indication of the direction of the turning maneuver, various alert lamp indications, and the like in accordance with an instruction of the controller 70.

The navigation display 100 displays information provided from the car navigation system 60 or information instructed by the controller 70.

Next, a driving state display process executed by the controller 70 will be described.

Figure 3:
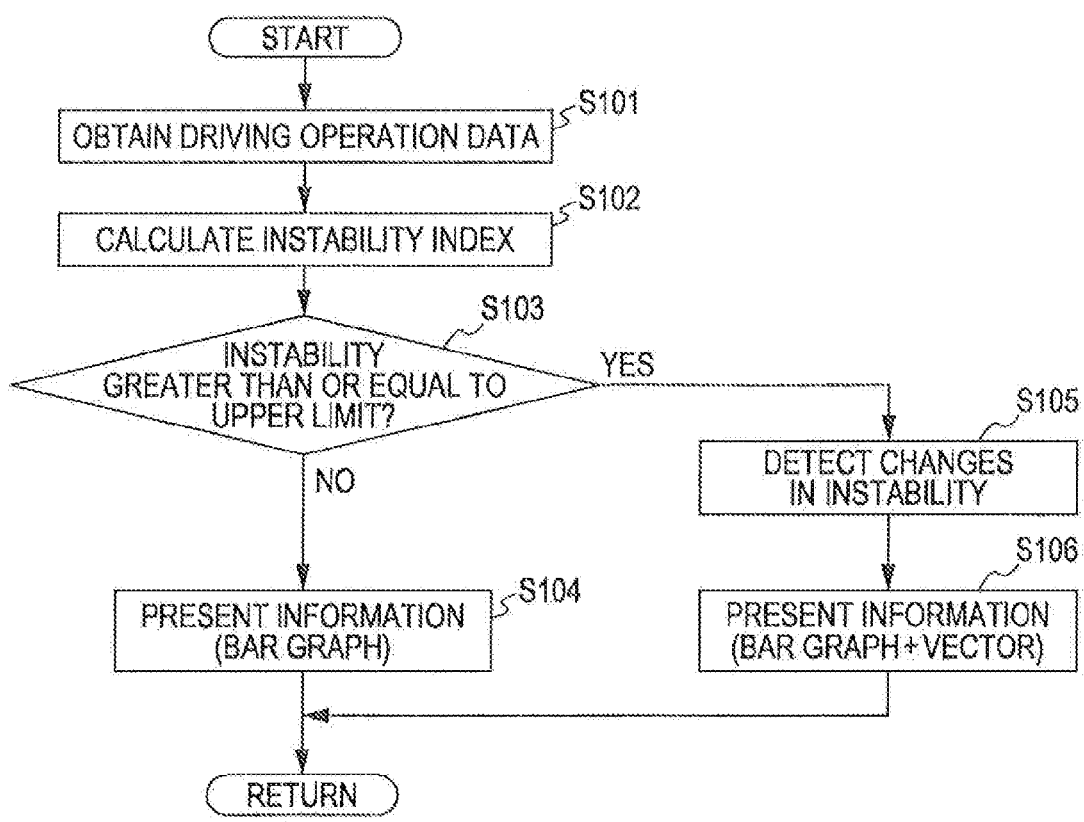
FIG. 3 is a flowchart illustrating a driving state display process executed by a controller.

FIG. 3 is a flowchart illustrating the driving state display process executed by the controller 70. When the ignition is on, the controller 70 repeatedly executes the driving state display process.

In FIG. 3, when the driving state display process is started, the controller 70 obtains data regarding the operation of the driver (steering angle, accelerator pedal/brake pedal operation, and turn indicator lever operation), and data regarding the driving state of the vehicle (vehicle speed, longitudinal acceleration, lateral acceleration, and elapsed time since the start of driving) (step S101).

Then, the controller 70 calculates an index indicating driving instability of the vehicle driven by the driver (step S102).

Specifically, the controller 70 calculates, as elements for estimating the instability, an index (index A) based on the steering operation and pedal operation, an index (index B) based on the frequency of occurrence of short following distances, and an index (index C) based on the acceleration or deceleration or lateral acceleration.

The index A is an index based on continuous operations performed during driving. Examples of the index A may include steering entropy or disturbance of pedal operation. The term "disturbance of pedal operation", as used here, refers to the degree to which pedals are operated with respect to the target value, and may be represented by, for example, the number of operations performed per unit time.

The index B can be calculated by detecting the frequency of occurrence of the following distance from the vehicle in front being smaller than a set threshold (that is, the frequency of occurrence of following distances).

The index C can be calculated in accordance with whether or not acceleration in the front-rear direction and acceleration in the right-left direction are within a proper range. The index C can be the degree to which the above accelerations exceed the proper range.

Figure 4A:
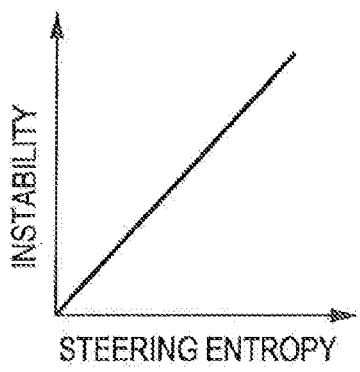
FIGS. 4A to 4E are diagrams illustrating an example of characteristics for setting indices A to C.
Figure 4B:
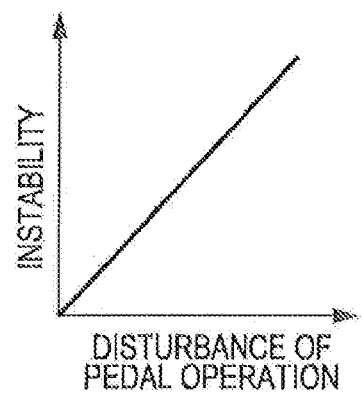
Figure 4C:
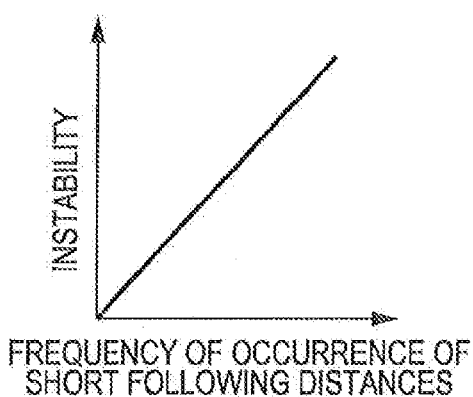
Figure 4D:
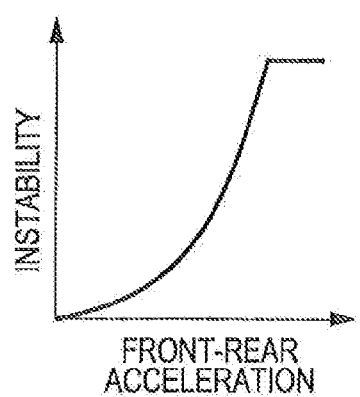
Figure 4E:
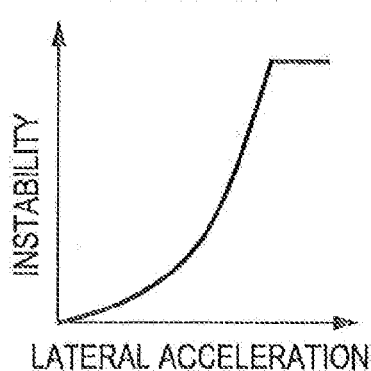

FIGS. 4A to 4E are diagrams illustrating examples of characteristics for setting the indices A to C. FIG. 4A illustrates the relationship between steering entropy and instability, and FIG. 4B illustrates the relationship between the disturbance of pedal operation and instability. FIG. 4C illustrates the relationship between the frequency of occurrence of short following distances and instability. Further, FIG. 4D illustrates the relationship between acceleration or deceleration in the front-rear direction and instability, and FIG. 4E illustrates the relationship between acceleration in the right-left direction and instability.

The controller 70 obtains the instability for each of the items represented by the abscissas from the relationships illustrated in FIGS. 4A to 4E, and calculates the instability for each of the indices A to C. In this case, the degree of instability indicating each index may be determined by totaling the instability values for the respective items included in the index, multiplying the instability values, using the maximum value, or using any other method. Alternatively, an overall instability index DrState may be calculated by totaling the instability values indicating the indices A to C, multiplying the instability values, using the maximum value, or using any other method.

The controller 70 stores the calculated instability indices as records in a random access memory (RAM), and uses them to display previous instability values on a bar graph when information is to be provided later.

Then, the controller 70 determines, based on the obtained instability index, whether or not the driving instability is greater than or equal to the upper limit (limit to display) displayable on a bar graph (step S103).

That is, the controller 70 determines whether or not the overall instability index DrState is greater than or equal to the upper limit DrStateTH displayable on a bar graph.

If it is determined in step S103 that that the driving instability is not greater than or equal to the upper limit displayable on a bar graph, the controller 70 displays, based on the instability index DrState stored in the RAM, the instability records on a bar graph (step S104).

In this case, the controller 70 defines a representative value of the instability index DrState for each set time segment, and calculates a variable BarDisp indicating a bar graph from the representative values. Then, the controller 70 calculates the variables BarDisp corresponding to instability indices (representative values) for a certain number of (for example, eight) time segments, and displays bar graphs with heights corresponding to the calculated variables BarDisp.

Here, a representative value may be defined by using a technique in which the maximum value of the instability indices DrState within a given time segment is used as a representative value or a technique in which the average value of the instability indices DrState within a given time segment is used as a representative value. Further, a variable BarDisp indicating a bar graph has a value that is proportional to the instability index DrState if the instability index DrState is less than the upper limit DrStateTH displayable on a bar graph, and has a value corresponding to the upper limit DrStateTH displayable on a bar graph if the instability index DrState is greater than or equal to the upper limit DrStateTH displayable on a bar graph.

Figure 5:
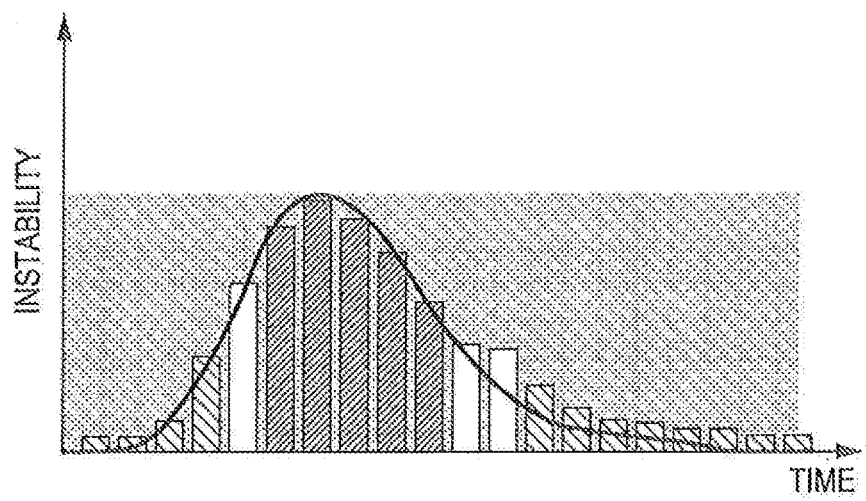
FIG. 5 is a diagram illustrating an example of a bar graph displayed by the controller.

FIG. 5 is a diagram illustrating an example of a bar graph that is displayed by the controller 70 in step S104. As illustrated in FIG. 5, if driving instability is kept less than the upper limit displayable on a bar graph, bar graphs with heights corresponding to the instability indices (representative values) for the respective time segments are displayed. A bar graph may be displayed using a different color in accordance with the height of the bar graph. For example, bar heights up to the upper limit may be divided into three groups, and a bar graph may be displayed in such a manner that bars in the lowest height range are displayed in green, bars in the greatest height range are displayed in red, and bars in the intermediate height range are displayed in yellow.

In FIG. 5, the shaded region represents the range less than or equal to the upper limit displayable on a bar graph, and the plotted line represents estimated instability. The shaded region and the plotted line are illustrated for reference only, and are not displayed in the actual display screen. This similarly applies to each figure which illustrates a bar graph on a display screen in the following description.

After step S104, the controller 70 repeatedly performs the driving state display process.

On the other hand, if it is determined in step S103 that the driving instability is greater than or equal to the upper limit displayable on a bar graph, the controller 70 detects changes in instability (step S105).

In this case, the controller 70 calculates, as a value representing changes in instability, the ratio DrStateCom (=DrState2/DrState1) of the instability index (representative value: DrState2) in the current time segment to the instability index (representative value: DrState1) in the preceding time segment. If the ratio DrStateCom is less than 0.8, the controller 70 sets a rate-of-change flag of "−1". If the ratio DrStateCom is greater than 1.2, the controller 70 sets a rate-of-change flag of "+1". Otherwise (if the ratio DrStateCom is greater than or equal to 0.8 and less than or equal to 1.2), the controller 70 sets a rate-of-change flag of "0".

Subsequently, the controller 70 displays, based on the instability index DrState stored in the RAM, the instability records on a bar graph, and also displays vectors (arrows) indicating the changes in instability (step S106).

In this case, as in step S104, the controller 70 displays a bar graph, and also displays, together with the bar graph, vectors indicating the changes in instability, thereby informing the driver of the instability.

Specifically, the controller 70 displays a vector directed upward and toward the right when the flag for the rate of change in instability is "+1", a vector directed downward and toward the right when the flag for the rate of change in instability is "−1", and a vector directed toward the right when the flag for the rate of change in instability is "0".

Figure 6:
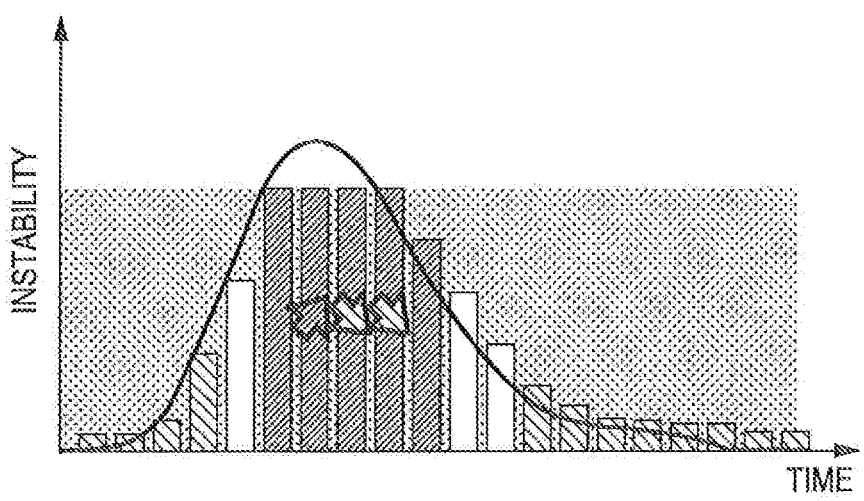
FIG. 6 is a diagram illustrating an example of a bar graph and vectors displayed by the controller.

FIG. 6 is a diagram illustrating an example of a bar graph and vectors that are displayed by the controller 70 in step S106.

As illustrated in FIG. 6, if the driving instability is greater than or equal to the upper limit displayable on a bar graph, bar graphs with heights corresponding to the instability indices (representative values) are displayed for the respective time segments in which the driving instability is less than the upper limit displayable on a bar graph. For each time segment in which the driving instability is greater than or equal to the upper limit displayable on a bar graph, a bar graph corresponding to the upper limit displayable on a bar graph and a vector indicating the changes in instability within the time segment are displayed.

Therefore, the driver can be informed of the changes in instability even for the instability in a range in which changes are not displayable on a bar graph.

After step S106, the controller 70 repeatedly performs the driving state display process.

The stability display apparatus 1A repeatedly executes the driving state display process when the ignition is on. During driving, the stability display apparatus 1A calculates the instability index DrState indicating the driver's instability, and determines whether or not the instability index DrState is greater than or equal to the upper limit DrStateTH displayable on a bar graph.

If the instability index DrState is less than the upper limit DrStateTH displayable on a bar graph, the stability display apparatus 1A displays instability records using a bar graph (see FIG. 5).

When the instability index DrState becomes greater than or equal to the upper limit DrStateTH displayable on a bar graph, the stability display apparatus 1A detects changes in instability, and displays a vector indicating the changes in instability together with the bar graph (see FIG. 6).

Therefore, even if the instability is beyond a range displayable on a bar graph, the driver can be quickly informed of the changes in instability in an easy-to-understand manner.

That is, if the driver's driving instability exceeds the upper limit of a bar graph so that the driver is not able to check the instability, the most recent driving state is directly displayed as a shape indicating an increase and decrease in instability. The driver's motivation for stable driving can be increased.

Accordingly, the stability display apparatus 1A according to this embodiment obtains the driver's driving instability, and displays, in addition to a bar graph, a vector (arrow shape) indicating changes in instability if the driving instability exceeds the upper limit displayable on a bar graph. Therefore, the driver can be quickly and more accurately informed of the changes in instability in an easy-to-understand manner.

In this embodiment, the accelerator pedal opening angle sensor 10, the following-distance sensor 20, the steering angle sensor 40, and the wheel speed sensors 50FR, 50FL, 50RR, and 50RL correspond to a driving state detection unit. Further, the controller 70 corresponds to an instability estimation unit, and the controller 70 and the navigation display 100 correspond to a display unit and an out-of-range changes display unit.

The first embodiment provides the following advantages. (1) The driving instability of a vehicle in operation is estimated using an index indicating driving instability, and changes of the index beyond the upper limit displayable in a display region are displayed in the display region. Therefore, the driver can be informed of the changes in index indicating instability by using a display region.

(2) The out-of-range changes display unit causes a shape indicating the direction of the changes of the index estimated by the instability estimation unit, which are beyond the upper limit, to be displayed in a display region of the display unit. Therefore, the driver can be quickly informed of the changes in instability in an easy-to-understand manner.

Next, a second embodiment will be described.

A stability display apparatus 1A according to this embodiment has a system configuration similar to that in the first embodiment illustrated in FIG. 2, and a different portion, i.e., a driving state display process, will be mainly described.

Figure 7:
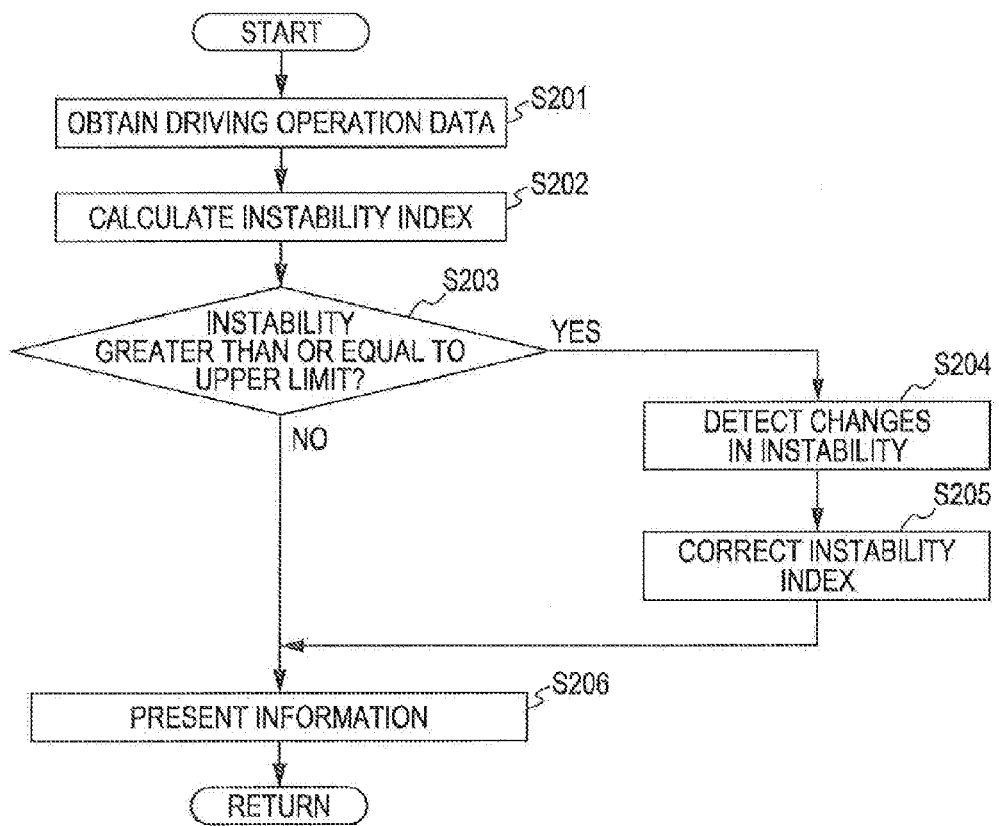
FIG. 7 is a flowchart illustrating a driving state display process executed by the controller.

FIG. 7 is a flowchart illustrating the driving state display process executed by the controller 70. When the ignition is on, the controller 70 repeatedly executes the driving state display process. In FIG. 7, the processing of steps S201 to S203 is similar to the processing of steps S101 to S103 in FIG. 3 according to the first embodiment, respectively.

If it is determined in step S203 that the driving instability is greater than or equal to the upper limit displayable on a bar graph, the controller 70 detects changes in instability (step S204).

In this case, as in the first embodiment, the controller 70 calculates the ratio DrStateCom (=DrState2/DrState1) of the instability index (representative value: DrState2) in the current time segment to the instability index (representative value: DrState1) in the preceding time segment. Then, the controller 70 corrects the instability index DrState using the calculated ratio DrStateCom of the instability indices (representative values) and a correction coefficient k (step S205).

Figure 8:
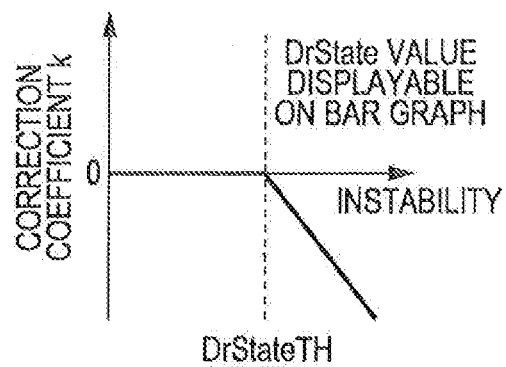
FIG. 8 is a diagram illustrating characteristics of a correction coefficient k.

FIG. 8 is a diagram illustrating the characteristics of the correction coefficient k. As illustrated in FIG. 8, the correction coefficient k is "0" if the instability index DrState is less than the upper limit DrStateTH displayable on a bar graph. On the other hand, if the instability index DrState is greater than or equal to the upper limit DrStateTH displayable on a bar graph, the correction coefficient k has a smaller value (a negative value with a larger absolute value) when the instability index DrState increases. The correction coefficient k may be a variable that determines a weight given to a differential value of the instability index DrState.

In step S205, a corrected value DrStateMod of the instability index DrState is calculated using the correction coefficient k by calculating equation:

$$DrStateMod = DrState + k/DrStateCom.$$

If it is determined in step S203 that the driving instability is not greater than or equal to the upper limit displayable on a bar graph or after step S205, the controller 70 displays instability records using a bar graph on the basis of the instability index DrState stored in the RAM or the corrected value DrStateMod of the instability index DrState calculated in step S205 (step S206).

Figure 9:
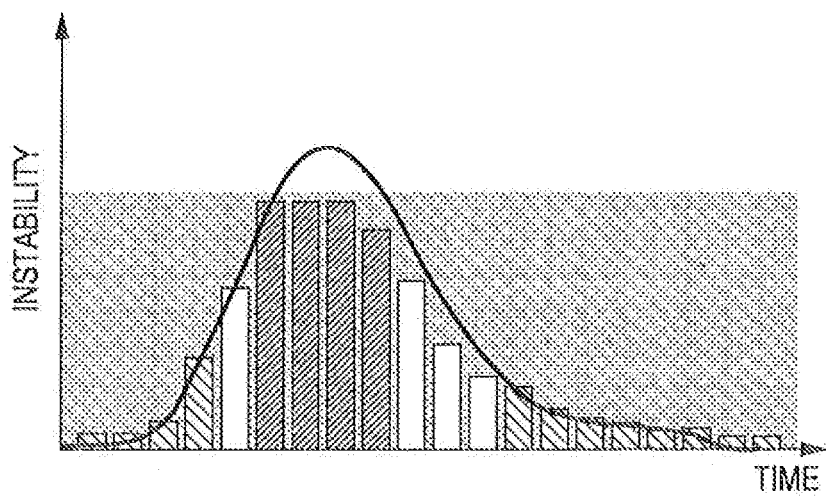
FIG. 9 is a diagram illustrating an example of a bar graph displayed using a corrected value DrStateMod of an instability index DrState.

FIG. 9 is a diagram illustrating an example of a bar graph displayed using the corrected value DrStateMod of the instability index DrState. As illustrated in FIG. 9, when a bar graph is displayed reflecting a corrected instability index, if the instability index tends to decrease even in a range greater than or equal to the upper limit DrStateTH displayable on a bar graph, the driver can be informed of the decrease of the instability index by using the bar graph.

After step S206, the controller 70 repeatedly performs the driving state display process.

Next, the operation will be described.

The stability display apparatus 1A repeatedly executes the driving state display process when the ignition is on.

During driving of the vehicle, the stability display apparatus 1A calculates the instability index DrState indicating the driver's instability, and determines whether or not the instability index DrState is greater than or equal to the upper limit DrStateTH displayable on a bar graph. If the instability index DrState is less than the upper limit DrStateTH displayable on a bar graph, the stability display apparatus 1A displays instability records using a bar graph (see FIG. 5).

Further, when the instability index DrState becomes greater than or equal to the upper limit DrStateTH displayable on a bar graph, the stability display apparatus 1A detects changes in instability DrStateCom, and corrects the instability index DrState using the changes in instability DrStateCom and the correction coefficient k. Then, the stability display apparatus 1A displays a bar graph using the corrected value DrStateMod of the instability index DrState as an instability record (see FIG. 9).

Therefore, even if the instability is beyond a range displayable on a bar graph, the driver can be quickly informed of the changes in instability using a bar graph. That is, if the driver's driving instability exceeds the upper limit of a bar graph so that the driver is not able to check the instability, correction is performed so that the improvement in driving instability can increase the response to the display of a bar graph, thereby increasing the driver's motivation for stable driving.

Accordingly, the stability display apparatus 1A according to this embodiment obtains the driver's driving instability. If the driving instability exceeds the upper limit displayable on a bar graph, the index of the obtained instability is corrected in accordance with the tendency of decreasing instability, and a bar graph is displayed based on the corrected instability index.

Therefore, the driver can be quickly and accurately informed of the changes in instability by using a bar graph.

In this embodiment, the accelerator pedal opening angle sensor 10, the following-distance sensor 20, the steering angle sensor 40, and the wheel speed sensors 50FR, 50FL, 50RR, and 50RL correspond to a driving state detection unit. Further, the controller 70 corresponds to an instability estimation unit, and the controller 70 and the navigation display 100 correspond to a display unit and an out-of-range changes display unit.

With second embodiment, an index indicating driving instability is corrected so as to decrease in accordance with changes of the index indicating the driver's instability, which are beyond the upper limit and which exhibits a tendency of decreasing the index, and the result is displayed on the display unit. Therefore, the driver can be quickly and accurately informed of the changes in instability, as an index indicating instability which is displayed on the display unit.

Next, a third embodiment will be described. A stability display apparatus 1A according to this embodiment has a system configuration similar to that in the first embodiment illustrated in FIG. 2, and a different portion, i.e., a driving state display process, will be mainly described.

Figure 10:
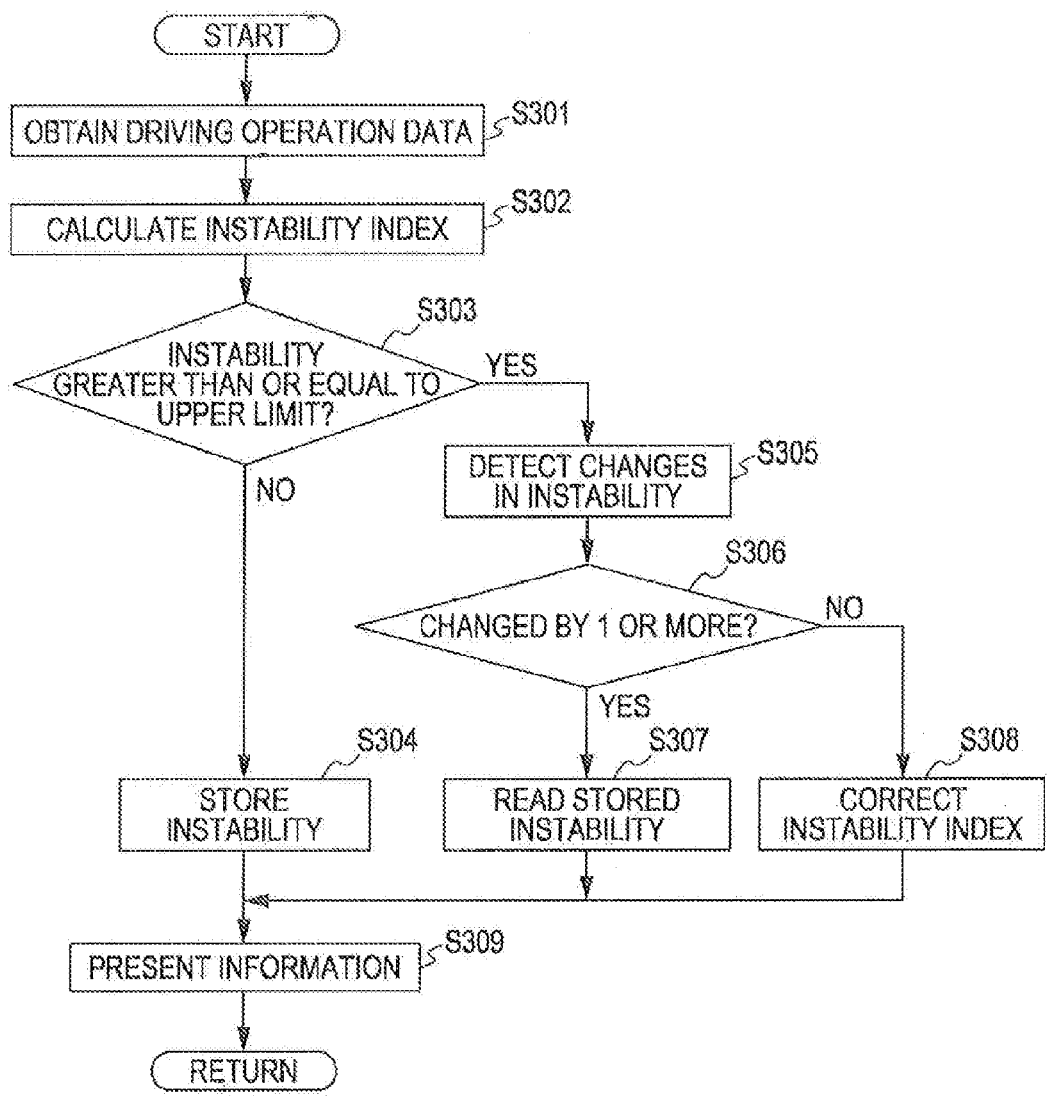
FIG. 10 is a flowchart illustrating a driving state display process executed by the controller.

FIG. 10 is a flowchart illustrating the driving state display process executed by the controller 70. When the ignition is on, the controller 70 repeatedly executes the driving state display process. In FIG. 10, the processing of steps S301 to S303 is similar to the processing of steps S101 to S103 in FIG. 3 according to the first embodiment, respectively.

If it is determined in step S303 that the driving instability is not greater than or equal to the upper limit displayable on a bar graph, the controller 70 stores the instability index (latest instability in a range displayable on a bar graph) DrStateMem calculated in step S302 in the RAM (step S304).

On the other hand, if it is determined in step S303 that the driving instability is greater than or equal to the upper limit displayable on a bar graph, the controller 70 detects changes in instability (step S305).

In this case, as in the first embodiment, the controller 70 calculates the ratio DrStateCom (=DrState2/DrState1) of the instability index (representative value: DrState2) in the current time segment to the instability index (representative value: DrState1) in the preceding time segment.

Then, the controller 70 determines whether or not the instability is changed by "1" or more (step S306). If it is determined that the instability is changed by "1" or more, the controller 70 reads the instability index (latest instability in a range displayable on a bar graph) DrStateMem stored in the RAM (step S307).

On the other hand, if it is determined in step S306 that the instability is not changed by "1" or more, the controller 70 reads the instability index (latest instability in a range displayable on a bar graph) DrStateMem stored in the RAM, and corrects the read instability index using the changes in instability DrStateCom (step S308).

Specifically, the controller 70 calculates a corrected instability index value DrStateMod by calculating the equation:

$$DrStateMod = DrStateMem \times DrStateCom.$$

After steps S304, S307, and S308, the controller 70 displays instability records using a bar graph on the basis of the instability index (latest instability in a range displayable on a bar graph) DrStateMem stored in the RAM and the corrected instability index value DrStateMod calculated in step S308 (step S309).

Figure 11:
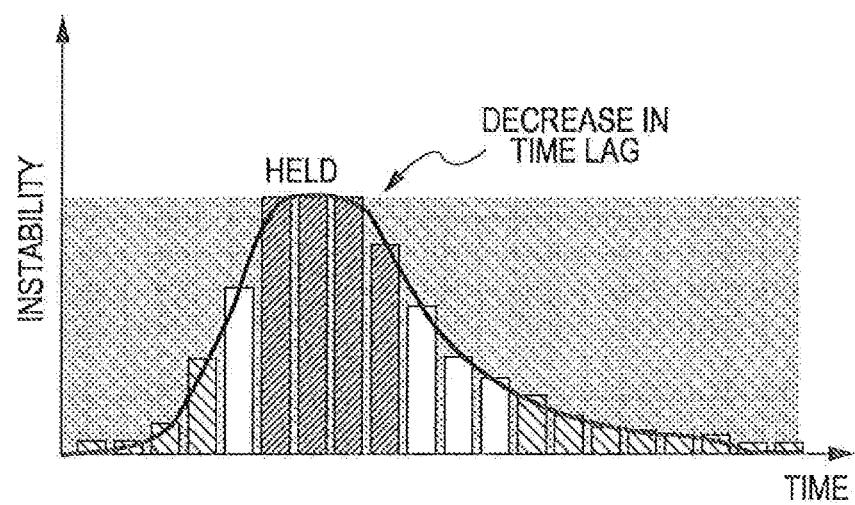
FIG. 11 is a diagram illustrating a bar graph displayed using the latest instability DrStateMem in a range displayable on a bar graph and using a corrected instability index value DrStateMod.

FIG. 11 is a diagram illustrating an example of a bar graph displayed using the latest instability DrStateMem in a range displayable on a bar graph and using the corrected instability index value DrStateMod.

As illustrated in FIG. 11, when a bar graph is displayed using the latest instability DrStateMem in a range displayable on a bar graph and using the corrected instability index value DrStateMod, if the instability increases in the range that is greater than or equal to upper limit DrStateTH displayable on a bar graph, the controller 70 displays the latest instability DrStateMem in the range displayable on a bar graph.

On the other hand, if the instability decreases in the range that is greater than or equal to the upper limit DrStateTH displayable on a bar graph, the controller 70 displays the corrected instability index value DrStateMod in the range up to the upper limit displayable on a bar graph. After step S309, the controller 70 repeatedly performs the driving state display process.

Next, the operation will be described. The stability display apparatus 1A repeatedly executes the driving state display process when the ignition is on.

During the driving of the driver, the stability display apparatus 1A calculates the instability index DrState indicating the driver's instability, and determines whether or not the instability index DrState is greater than or equal to the upper limit DrStateTH displayable on a bar graph.

If the instability index DrState is less than the upper limit DrStateTH displayable on a bar graph, the stability display apparatus 1A stores the instability index DrState in the RAM, and displays instability records using a bar graph (see FIG. 5).

Further, when the instability index DrState becomes greater than or equal to the upper limit DrStateTH displayable on a bar graph, the stability display apparatus 1A detects changes in instability DrStateCom, and corrects the instability index using the instability index DrState stored in the RAM and using the changes in instability DrStateCom. Then, the stability display apparatus 1A displays a bar graph using the corrected instability index value DrStateMod as an instability record (see FIG. 11).

Therefore, even if the instability is beyond a range displayable on a bar graph, the driver can be quickly informed of the changes in instability using a bar graph. That is, in order to avoid a situation where the driver is not able to check the instability because the driver's driving instability exceeds the upper limit of a bar graph, an instability index that falls below the upper limit to display on a bar graph is held. Thus, the driver can check the most recent driving instability. Therefore, the driver's motivation for stable driving can be increased.

Accordingly, the stability display apparatus 1A according to this embodiment obtains the driver's driving instability, and stores the instability index immediately before the instability exceeds the upper limit displayable on a bar graph. When the instability exceeds the upper limit displayable on a bar graph and when the instability tends to increase, the stored instability index is displayed. On the other hand, when the instability exceeds the upper limit displayable on a bar graph and when the instability tends to decrease, the stored instability index is corrected in accordance with the degree of decrease of the instability, and a bar graph is displayed based on the corrected instability index.

Therefore, the driver can be quickly and accurately informed of the changes in instability by using a bar graph.

In this embodiment, the accelerator pedal opening angle sensor 10, the following-distance sensor 20, the steering angle sensor 40, and the wheel speed sensors 50FR, 50FL, 50RR, and 50RL correspond to a driving state detection unit. Further, the controller 70 corresponds to an instability estimation unit, and the controller 70 and the navigation display 100 correspond to a display unit and an out-of-range changes display unit.

In the third embodiment, the value immediately before the index indicating the driver's instability exceeds the upper limit is held. When the changes of the index exhibit a tendency of decreasing, the held index indicating the driving instability is corrected so as to decrease in accordance with the changes of the index, and the result is displayed on the display unit. Therefore, the driver can be more quickly and accurately informed of the changes in instability as an index indicating instability which is displayed on the display unit.

Next, a fourth embodiment will be described. A stability display apparatus 1A according to this embodiment has a system configuration similar to that in the first embodiment illustrated in FIG. 2, and a different portion, i.e., a driving state display process, will be mainly described.

Figure 12:
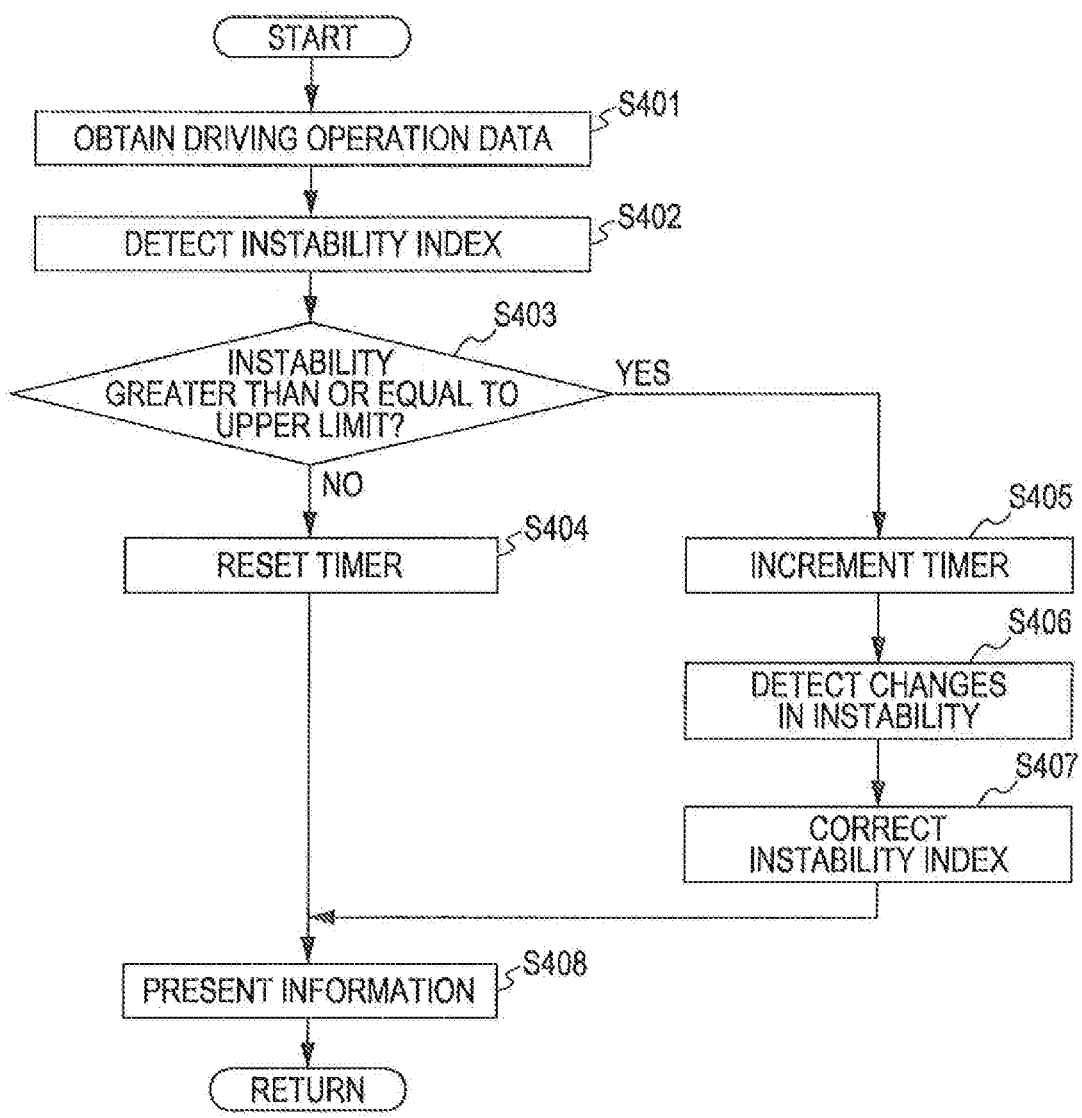
FIG. 12 is a flowchart illustrating a driving state display process executed by the controller.

FIG. 12 is a flowchart illustrating the driving state display process executed by the controller 70. When the ignition is on, the controller 70 repeatedly executes the driving state display process. In FIG. 12, the processing of steps S401 to S403 is similar to the processing of steps S101 to S103 in FIG. 3 according to the first embodiment, respectively.

If it is determined in step S403 that the driving instability is not greater than or equal to the upper limit displayable on a bar graph, the controller 70 resets the value of a timer for counting the time during which the driving instability is greater than or equal to the upper limit displayable on a bar graph, and sets the value of the timer to zero (step S404).

On the other hand, if it is determined in step S403 that the driving instability is greater than or equal to the upper limit displayable on a bar graph, the controller 70 increments the value of the timer by 1 (step S405), and detects changes in instability (step S406).

In this case, as in the first embodiment, the controller 70 calculates the ratio DrStateCom (=DrState2/DrState1) of the instability index (representative value: DrState2) in the current time segment to the instability index (representative value: DrState1) in the preceding time segment.

Then, the controller 70 corrects the instability index DrState using the calculated ratio DrStateCom of the instability indices (representative values) and correction coefficients k and l (step S407).

Figure 13:
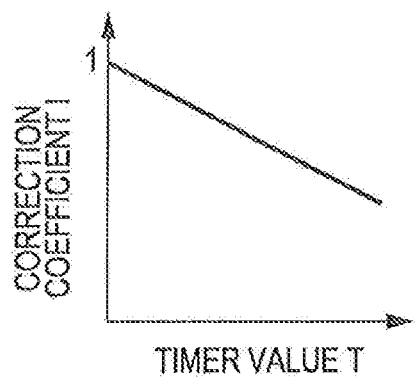
FIG. 13 is a diagram illustrating characteristics of a correction coefficient l.

FIG. 13 is a diagram illustrating the characteristics of the correction coefficient l. As illustrated in FIG. 13, the correction coefficient l has a characteristic of decreasing from "1" as the value T of a timer for counting the time during which the driving instability is greater than or equal to the upper limit displayable on a bar graph increases.

With the use of the correction coefficient l, the longer the time during which the instability index DrState is greater than or equal to the upper limit displayable on a bar graph, the smaller the amount of correction of the instability index DrState. The correction coefficient k is similar to that in the second embodiment.

In step S407, a corrected value DrStateMod of the instability index DrState is calculated using the correction coefficients k and l by calculating the equation:

$$DrStateMod = DrState + k \times l / DrStateCom.$$

After steps S404 and S407, the controller 70 displays instability records on the basis of the instability index DrState obtained in step S402 or the corrected value DrStateMod of the instability index DrState calculated in step S407, using a bar graph (step S408).

Figure 14:
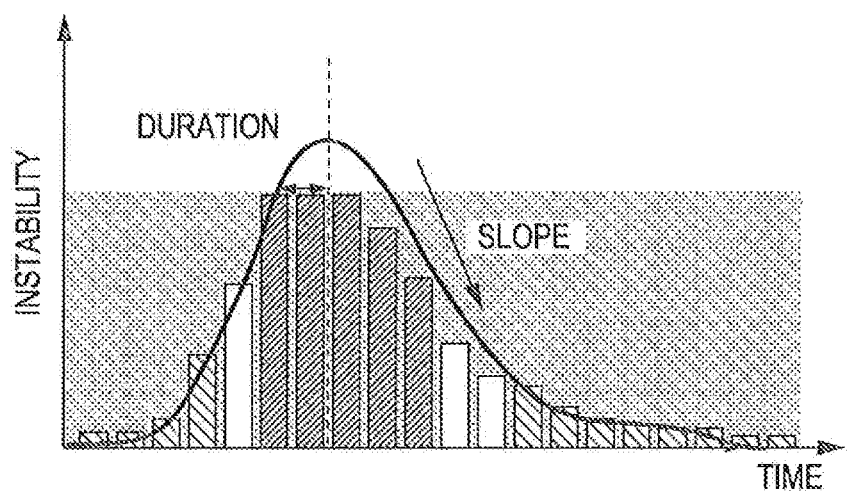
FIG. 14 is a diagram illustrating an example of a bar graph displayed using a corrected value DrStateMod of an instability index DrState.

FIG. 14 is a diagram illustrating an example of a bar graph displayed using the corrected value DrStateMod of the instability index DrState.

As illustrated in FIG. 14, when a bar graph is displayed reflecting a corrected instability index, if the instability index tends to decreases even in a range greater than or equal to the upper limit DrStateTH displayable on a bar graph, the driver can be informed of the decrease of the instability index by using the bar graph. Further, the longer the time during which the instability index is greater than or equal to the upper limit displayable on a bar graph, the smaller the amount of correction. Therefore, the driver can be informed of the changes in instability reflecting the duration during which the driver's instability is continued, by using a bar graph. After step S408, the controller 70 repeatedly performs the driving state display process.

Next, the operation will be described.

The stability display apparatus 1A repeatedly executes the driving state display process when the ignition is on.

During the driving of the driver, the stability display apparatus 1A calculates the instability index DrState indicating the driver's instability, and determines whether or not the instability index DrState is greater than or equal to the upper limit DrStateTH displayable on a bar graph.

If the instability index DrState is less than the upper limit DrStateTH displayable on a bar graph, the stability display apparatus 1A displays instability records using a bar graph (see FIG. 5).

Further, when the instability index DrState becomes greater than or equal to the upper limit DrStateTH displayable on a bar graph, the stability display apparatus 1A detects changes in instability DrStateCom, and corrects the instability index DrState using the changes in instability DrStateCom and the correction coefficients k and l.

Then, the stability display apparatus 1A displays a bar graph using the corrected value DrStateMod of the instability index DrState as an instability record (see FIG. 14).

Therefore, even if the instability is beyond a range displayable on a bar graph, the driver can be quickly informed of the changes in instability by using the bar graph. Furthermore, a corrected instability value can be presented in accordance with the duration during which the driver's instability is continued.

That is, in a situation where the driver's driving instability exceeds the upper limit of a bar graph, the bar heights of a bar graph are corrected using the time during which the instability exceeds the upper limit of a bar graph so that the situation where the instability exceeds the upper limit does not occur again. Therefore, the driver's motivation for stable driving can be maintained.

Accordingly, the stability display apparatus 1A according to this embodiment obtains the driver's driving instability. If the driving instability exceeds the upper limit displayable on a bar graph, the index of the obtained instability is corrected in accordance with the changes in instability and in accordance with the duration during which the instability is greater than or equal to a threshold, and a bar graph is displayed based on the corrected instability index.

Therefore, the driver can be quickly and accurately informed of the changes in instability by using a bar graph.

In this embodiment, the accelerator pedal opening angle sensor 10, the following-distance sensor 20, the steering angle sensor 40, and the wheel speed sensors 50FR, 50FL, 50RR, and 50RL correspond to a driving state detection unit. Further, the controller 70 corresponds to an instability estimation unit, and the controller 70 and the navigation display 100 correspond to a display unit and an out-of-range changes display unit.

In the fourth embodiment, when the changes of the index indicating the driver's instability exhibits a tendency of decreasing, after a delay time corresponding to the duration during which the index exceeds the upper limit has elapsed, the held index indicating the driving instability is corrected so as to decrease in accordance with the changes of the index, and the result is displayed on the display unit.

Therefore, the driver can be informed of the changes in instability as an index indicating instability which is displayed on the display unit while reflecting the time during which the index indicating the instability exceeds the upper limit.

According to the present invention, therefore, the driver can be more quickly and accurately informed of information regarding driving stability.

Next, a fifth embodiment will be described. A stability display apparatus 1A according to this embodiment has a system configuration similar to that in the first embodiment illustrated in FIG. 2, and a different portion, i.e., a driving state display process, will be mainly described.

Figure 15:
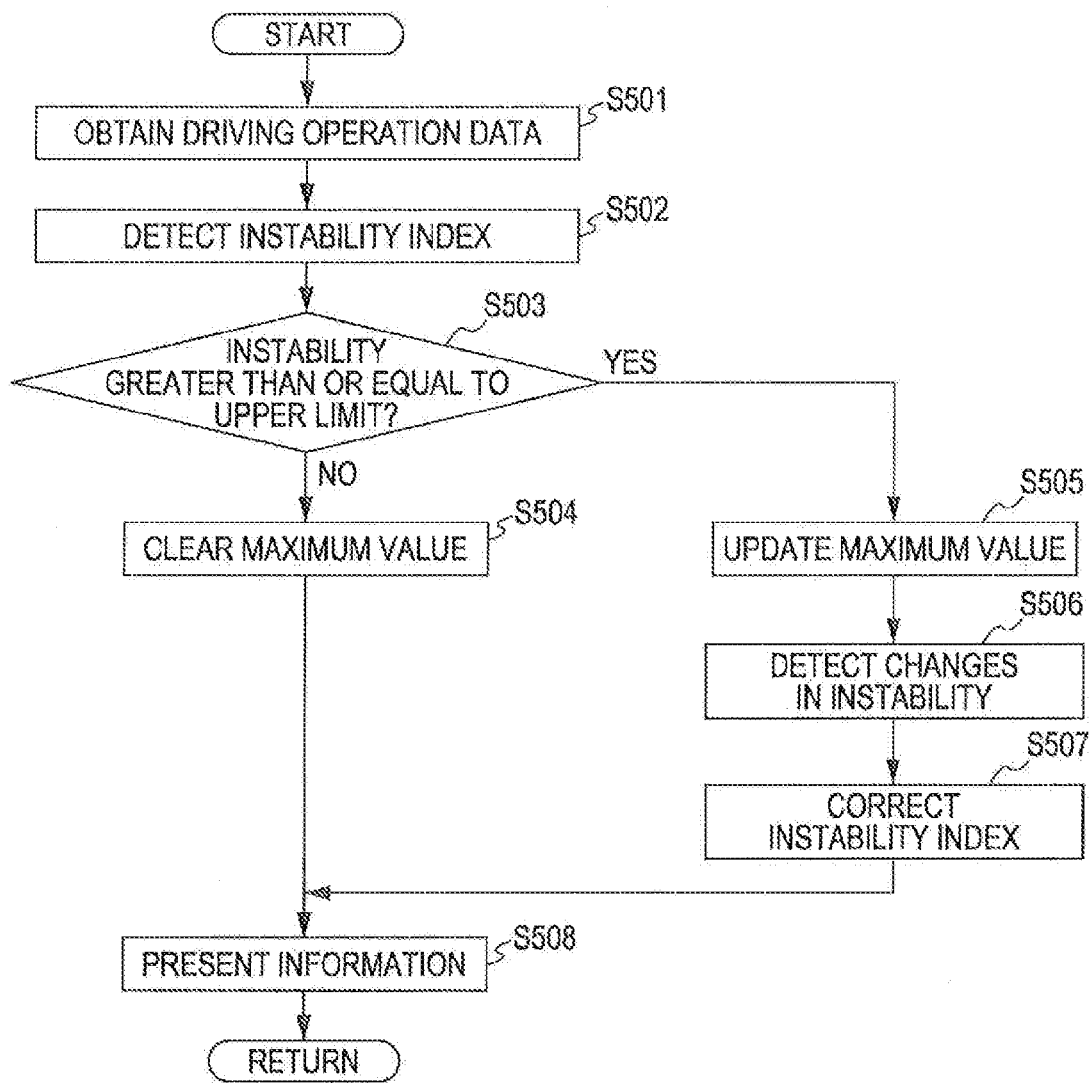
FIG. 15 is a flowchart illustrating a driving state display process executed by the controller.

FIG. 15 is a flowchart illustrating the driving state display process executed by the controller 70. When the ignition is on, the controller 70 repeatedly executes the driving state display process. In FIG. 15, the processing of steps S501 to S503 is similar to the processing of steps S101 to S103 in FIG. 3 according to the first embodiment, respectively.

If it is determined in step S503 that the driving instability is not greater than or equal to the upper limit displayable on a bar graph, the controller 70 clears a value DrStateMax that is held as a maximum value of the instability index DrState, and sets the value to zero (step S504).

On the other hand, if it is determined in step S503 that the driving instability is greater than or equal to the upper limit displayable on a bar graph, the controller 70 compares the value DrStateMax that is held as the maximum value of the instability index with the instability index DrState calculated in step S502, and selects and holds the larger value (step S505).

That is, in step S505, the controller 70 selects the higher one of the value DrStateMax that is held as the maximum value of the instability index and the instability index DrState calculated in step S502, by calculating the equation:

$$DrStateMax=Max(DrStateMax, DrState).$$

Then, the controller 70 detects changes in instability (step S506). In this case, as in the first embodiment, the controller 70 calculates the ratio DrStateCom (=DrState2/DrState1) of the instability index (representative value: DrState2) in the current time segment to the instability index (representative value: DrState1) in the preceding time segment.

Then, the controller 70 corrects the held maximum value DrStateMax of the instability index using the calculated ratio DrStateCom of the instability indices (representative values) and correction coefficients k and m (step S507).

Figure 16:
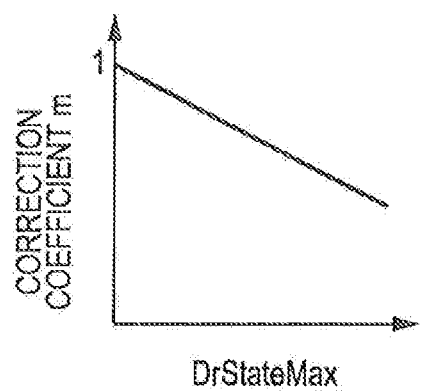
FIG. 16 is a diagram illustrating characteristics of a correction coefficient m.

FIG. 16 is a diagram illustrating the characteristics of the correction coefficient m. As illustrated in FIG. 16, the correction coefficient m has a characteristic of decreasing from "1" as the maximum value DrStateMax of the instability index increases.

With the use of the correction coefficient m, the instability index DrState is greater than or equal to the upper limit displayable on a bar graph, and the larger the value of the correction coefficient m, the smaller the amount of correction of the instability index DrState. The correction coefficient k is similar to that in the second embodiment.

In step S507, a corrected value DrStateMod of the instability index DrState is corrected using the correction coefficients k and m by calculating the equation:

$$DrStateMod=DrState+k \times m/DrStateCom.$$

After steps S504 and S507, the controller 70 displays instability records on the basis of the instability index DrState obtained in step S502 or the corrected value DrStateMod of the instability index DrState calculated in step S507 (step S508).

Figure 17:
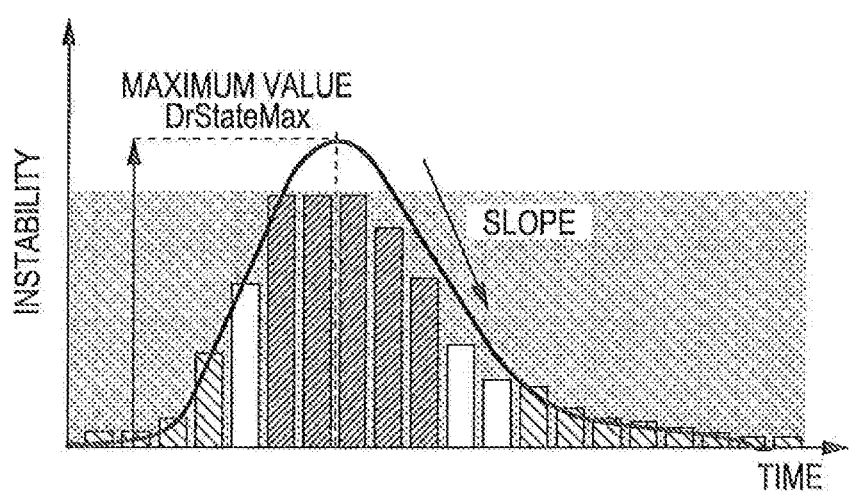
FIG. 17 is a diagram illustrating an example of a bar graph displayed using a corrected value DrStateMod of an instability index DrState.

FIG. 17 is a diagram illustrating an example of a bar graph displayed using the corrected value DrStateMod of the instability index DrState.

When a bar graph is displayed reflecting a corrected instability index, if the instability index tends to decrease even in a range greater than or equal to the upper limit DrStateTH displayable on a bar graph, the driver can be informed of the decrease of the instability index by using the bar graph. Further, the instability index is greater than or equal to the upper limit displayable on a bar graph, and the larger the value of the index, the smaller the amount of correction. Therefore, the driver can be informed of the changes in instability reflecting the degree of the driver's instability, by using a bar graph. After step S508, the controller 70 repeatedly performs the driving state display process.

Next, the operation will be described. The stability display apparatus 1A repeatedly executes the driving state display process when the ignition is on.

During driving of the vehicle, the stability display apparatus 1A calculates the instability index DrState indicating the driver's instability, and determines whether or not the instability index DrState is greater than or equal to the upper limit DrStateTH displayable on a bar graph.

If the instability index DrState is less than the upper limit DrStateTH displayable on a bar graph, the stability display apparatus 1A displays instability records using a bar graph (see FIG. 5).

Further, when the instability index DrState becomes greater than or equal to the upper limit DrStateTH displayable on a bar graph, the stability display apparatus 1A obtains the maximum value DrStateMod of the instability index, and also detects changes in instability DrStateCom. Then, the stability display apparatus 1A corrects the instability index DrState using the changes in instability DrStateCom and the correction coefficients k and m.

Then, the stability display apparatus 1A displays a bar graph using the corrected value DrStateMod of the instability index DrState as an instability record (see FIG. 17). Therefore, even if the instability is beyond a range displayable on a bar graph, the driver can be quickly informed of the changes in instability by using the bar graph. Furthermore, a corrected instability value can be presented in accordance with the degree of the driver's instability.

That is, in a situation where the driver's driving instability exceeds the upper limit of a bar graph, the bar heights of a bar graph are corrected using the maximum value obtained when the instability exceeds the upper limit of a bar graph so that the situation where the instability exceeds the upper limit does not occur again. Therefore, the driver's motivation for stable driving can be maintained.

Accordingly, the stability display apparatus 1A according to this embodiment obtains the driver's driving instability. If the driving instability exceeds the upper limit displayable on a bar graph, the index of the obtained instability is corrected in accordance with the changes in instability and in accordance with the degree of instability (maximum value), and a bar graph is displayed based on the corrected instability index.

Therefore, the driver can be quickly and accurately informed of the changes in instability by using a bar graph.

In this embodiment, the accelerator pedal opening angle sensor 10, the following-distance sensor 20, the steering angle sensor 40, and the wheel speed sensors 50FR, 50FL, 50RR, and 50RL correspond to a driving state detection unit. Further, the controller 70 corresponds to an instability estimation unit, and the controller 70 and the navigation display 100 correspond to a display unit and an out-of-range changes display unit.

In the fifth embodiment, the index indicating driving instability is corrected so as to decrease in accordance with a maximum value obtained when the index indicating the driver's driving instability exceeds the upper limit and in accordance with changes of the index, and the result is displayed on the display means.

Therefore, the driver can be informed of the changes in instability as an index indicating instability displayed on the display unit while reflecting the degree (maximum value) obtained when the index indicating instability exceeds the upper limit. According to the present invention, therefore, the driver can be more accurately informed of information regarding driving stability.

Next, a sixth embodiment of the present invention will be described. A stability display apparatus 1A according to this embodiment has a system configuration similar to that in the first embodiment illustrated in FIG. 2, and a different portion, i.e., a driving state display process, will be mainly described.

Figure 18:
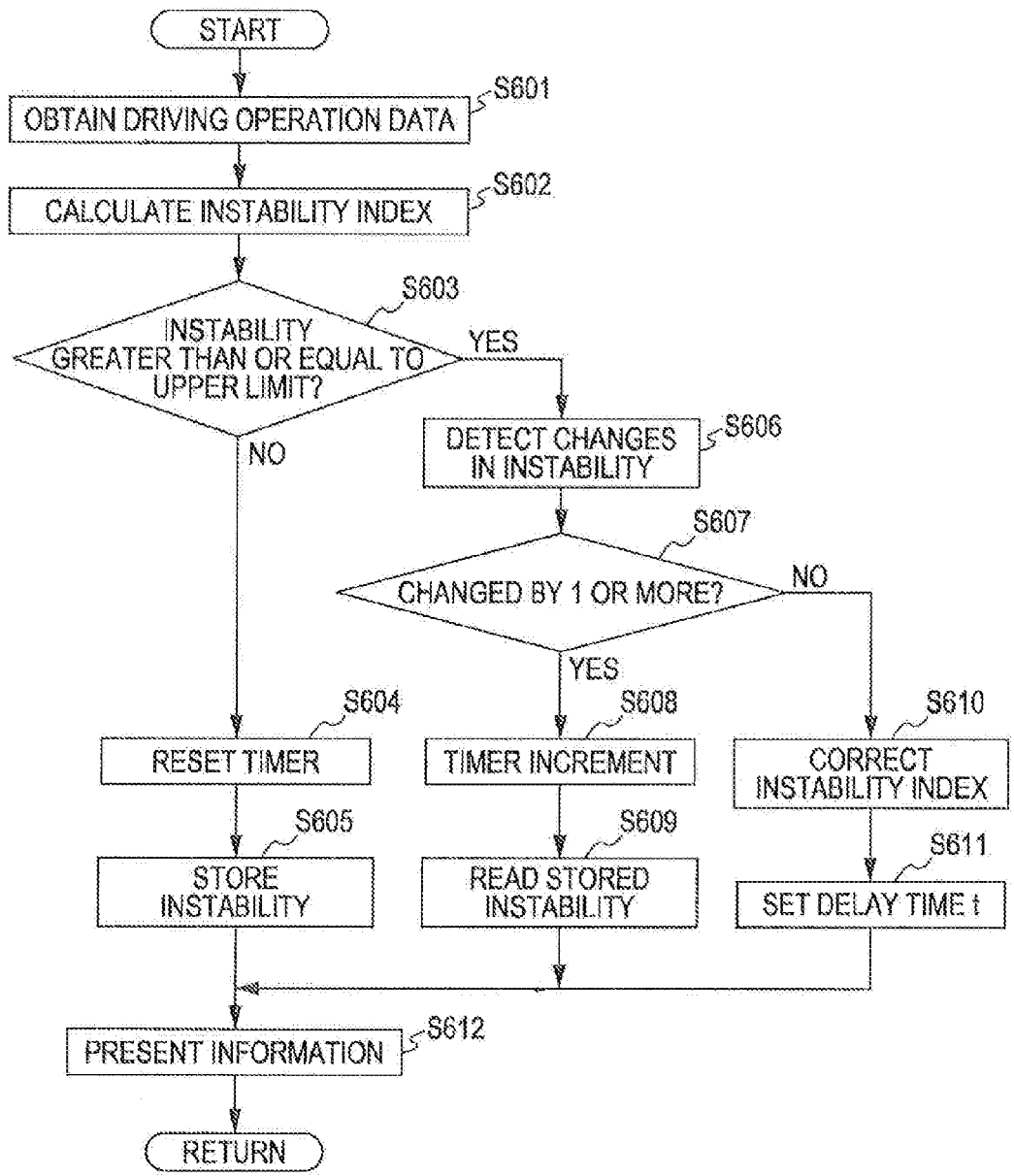
FIG. 18 is a flowchart illustrating a driving state display process executed by the controller.

FIG. 18 is a flowchart illustrating the driving state display process executed by the controller 70. When the ignition is on, the controller 70 repeatedly executes the driving state display process.

In FIG. 18, the processing of steps S601 to S603 is similar to the processing of steps S101 to S103 in FIG. 3 according to the first embodiment, respectively. If it is determined in step S603 that the driving instability is not greater than or equal to the upper limit displayable on a bar graph, the controller 70 resets the value of a timer for counting the time during which the driving instability is greater than or equal to the upper limit displayable on a bar graph, and sets the value of the timer to zero (step S604).

Then, the controller 70 stores the instability index (latest instability in a range displayable on a bar graph) DrStateMem calculated in step S602 in the RAM (step S605).

On the other hand, if it is determined in step S603 that the driving instability is greater than or equal to the upper limit displayable on a bar graph, the controller 70 detects changes in instability (step S606).

In this case, as in the first embodiment, the controller 70 calculates the ratio DrStateCom (=DrState2/DrState1) of the instability index (representative value: DrState2) in the current time segment to the instability index (representative value: DrState1) in the preceding time segment.

Then, the controller 70 determines whether or not the instability is changed by "1" or more (step S607). If it is determined that the instability is changed by "1" or more, the controller 70 increments the timer by 1 (step S608), and reads the instability index (latest instability in a range displayable on a bar graph) DrStateMem stored in the RAM (step S609).

On the other hand, if it is determined in step S607 that the instability is not changed by "1" or more, the controller 70 reads the instability index (latest instability in a range displayable on a bar graph) DrStateMem stored in the RAM, and corrects the read instability index using the changes in instability DrStateCom (step S610).

Specifically, the controller 70 calculates a corrected instability index value DrStateMod by calculating the equation:

$$DrStateMod = DrStateMem \times DrStateCom.$$

Then, the controller 70 sets a delay time t for delaying the display of a bar graph in accordance with a timer value T (step S611).

Figure 19:
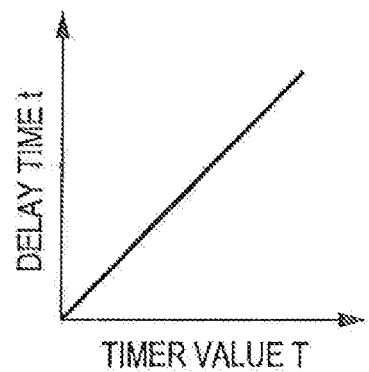
FIG. 19 is a diagram illustrating the relationship between a timer value T and a delay time t.

FIG. 19 is a diagram illustrating the relationship between the timer value T and the delay time t. As illustrated in FIG. 19, the delay time t has a value that is proportional to the timer value T.

In step S611, after the state where the driving instability is greater than or equal to the upper limit displayable on a bar graph is changed to the state where the instability index DrState tends to decrease, in the initial loop, the controller 70 sets a value that is proportional to the timer value T counted as the delay time t (see FIG. 19). On the other hand, after the state where the driving instability is greater than or equal to the upper limit displayable on a bar graph is changed to the state where the instability index DrState tends to decrease, in a loop other than the initial loop, the controller 70 sets the delay time t to zero (that is, a bar graph is displayed without delay).

After steps S609 and S611, the controller 70 displays instability records on the basis of the instability index DrStateMem obtained in step S602 the corrected value DrStateMod of the instability index DrStateMem calculated in step S610, by using a bar graph (step S612).

In this case, if a bar graph is displayed after step S611, the controller 70 displays instability records on the basis of the instability index (latest instability in a range displayable on a bar graph) DrStateMem stored in the RAM during the time corresponding to the delay time t set in step S611, by using a bar graph. Thus, the display of a bar graph is delayed by the time corresponding to the delay time t.

Figure 20:
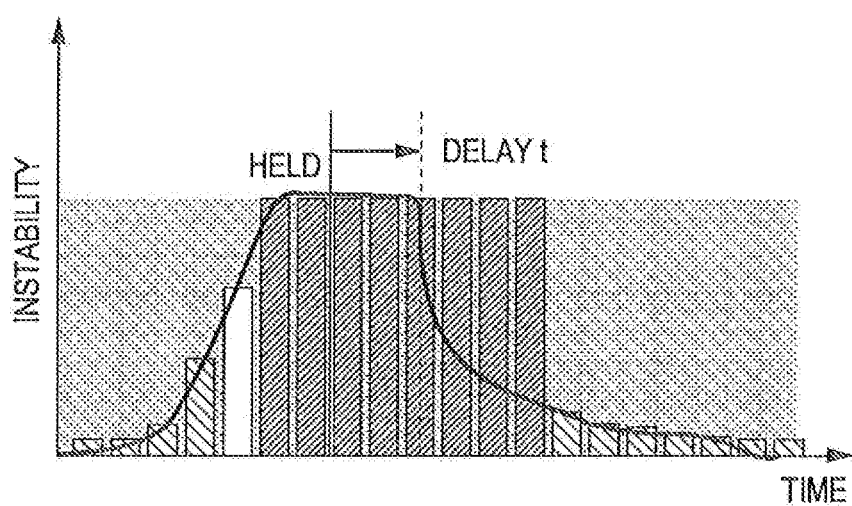
FIG. 20 is a diagram illustrating an example of a bar graph displayed using a corrected value DrStateMod of an instability index DrState.

FIG. 20 is a diagram illustrating an example of a bar graph displayed using the corrected value DrStateMod of the instability index DrStateMem. As illustrated in FIG. 20, when a bar graph is displayed reflecting a corrected instability index, if the instability index tends to decrease even in a range greater than or equal to the upper limit DrStateTH displayable on a bar graph, the driver can be informed of the decrease of the instability index by using a bar graph. Further, the longer the time during which the instability index is greater than or equal to the upper limit displayable on a bar graph, the smaller the amount of correction. Therefore, the driver can be informed of the changes in instability reflecting the duration during which the driver's instability is continued, by using a bar graph. Furthermore, the longer the time during which the instability index is greater than or equal to the upper limit displayable on a bar graph, the later the timing at which the driver is informed of the decrease of the instability index. Therefore, the driver's driving state can be brought to a more stable state.

After step S612, the controller 70 repeatedly performs the driving state display process.

Next, the operation will be described. The stability display apparatus 1A repeatedly executes the driving state display process when the ignition is on.

During the driving of the driver, the stability display apparatus 1A calculates the instability index DrState indicating the driver's instability, and determines whether or not the instability index DrState is greater than or equal to the upper limit DrStateTH displayable on a bar graph.

If the instability index DrState is less than the upper limit DrStateTH displayable on a bar graph, the stability display apparatus 1A stores the instability index DrState in the RAM, and displays instability records using a bar graph (see FIG. 5).

Further, when the instability index DrState becomes greater than or equal to the upper limit DrStateTH displayable on a bar graph, the stability display apparatus 1A detects changes in instability DrStateCom, and corrects the instability index DrState using the instability index DrStateMem stored in the RAM and the changes in instability DrStateCom.

Then, the stability display apparatus 1A displays a bar graph using the corrected value DrStateMod of the instability index DrState as an instability record (see FIG. 20).

In this case, it is assumed that the stability display apparatus 1A is configured such that the longer time during which the instability index is greater than or equal to the upper limit displayable on a bar graph, the later the timing at which the driver is informed of the decrease of the instability index.

Therefore, even if the instability is beyond a range displayable on a bar graph, the driver can be informed of the changes in instability by using the bar graph. Additionally, the timing at which the driver is informed of the changes in instability is delayed, thus bringing the driver's driving state to a more stable state.

That is, in a situation where the driver's driving instability exceeds the upper limit of a bar graph, the timing at which the bar heights of a bar graph are reduced is delayed using the time during which the instability exceeds the upper limit of a bar graph so that the situation where the instability exceeds the upper limit does not occur again. Therefore, the driver's motivation for stable driving can be maintained.

Accordingly, the stability display apparatus 1A according to this embodiment obtains the driver's driving instability, and stores the instability index immediately before the instability exceeds the upper limit displayable on a bar graph. When the instability exceeds the upper limit displayable on a bar graph and when the instability tends to increase, the stored instability index is displayed. On the other hand, when the instability exceeds the upper limit displayable on a bar graph and when the instability tends to decrease, the stored instability index is corrected in accordance with the degree of decrease in instability. Then, the timing is delayed based on the corrected instability index, in accordance with the time during which the instability exceeds the upper limit displayable on a bar graph, and a bar graph is displayed.

Therefore, the driver can be quickly and accurately informed of the changes in instability by using a bar graph. Additionally, the timing at which the driver is informed of the changes in instability is delayed, thus making it possible to bringing the driver's driving state to a more stable state.

In this embodiment, the accelerator pedal opening angle sensor 10, the following-distance sensor 20, the steering angle sensor 40, and the wheel speed sensors 50FR, 50FL, 50RR, and 50RL correspond to a driving state detection unit. Further, the controller 70 corresponds to an instability estimation unit, and the controller 70 and the navigation display 100 correspond to a display unit and an out-of-range changes display unit.

With the sixth embodiment, when the changes in the index indicating the driver's instability exhibits a tendency of decreasing, the held index indicating the driving instability is corrected so as to decrease in accordance with the duration during which the index exceeds the upper limit and the changes of the index, and the result is displayed on the display unit. Therefore, the driver can be informed of the changes in instability as an index indicating instability displayed on the display unit. Additionally, the timing at which the driver is informed of the changes in instability is delayed, thus making it possible to bringing the driver's driving state to a more stable state.

In the second to sixth embodiments described above, at the transition from the state where an instability index exceeds the upper limit displayable on a bar graph to the state where an instability index is less than or equal to the upper limit displayable on a bar graph, the current state can be returned to normal display without making the driver feel uncomfortable when viewing a displayed bar graph.

Specifically, when the state where a bar graph is displayed with an instability index corrected is changed to the state where a bar graph is displayed without any correction, a process for avoiding a bar graph from showing higher values than values of the instability index even though the instability index decreases is performed.

For example, in a state where a bar graph is displayed without an instability index being corrected, the same bar graph as that displayed with correction can be displayed until the current bar graph becomes lower than a bar graph displayed with the instability index corrected.

Therefore, a bar graph can be avoided from showing higher values than the instability index even though the instability index decreases, thereby avoiding the driver from feeling uncomfortable.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A stability display apparatus comprising:
a driving state detection unit configured to detect a driving state of a vehicle in operation;
a controller comprising an instability estimation unit configured to estimate an instability index indicating driving instability of the vehicle based on the driving state of the vehicle detected by the driving state detection unit and configured to determine a change in the instability index; and
a display unit configured to display the instability index estimated by the instability estimation unit in a display region within a range less than or equal to an upper limit that is a limit of display and configured to display in the display region a representation of the change in the instability index when the instability index is beyond the upper limit, wherein the instability estimation unit is further configured to estimate indices including a disturbance of pedal operation index and a following distance index, and wherein the instability index is estimated based on the indices.

2. The stability display apparatus according to claim 1, wherein the controller is configured to correct the instability index based on the change in the instability index which is beyond the upper limit and which exhibits a tendency of decreasing, and causes a corrected instability index to be displayed on the display unit as the representation of the change.

3. The stability display apparatus according to claim 2, wherein the controller is further configured to save each instability index for each time segment, and wherein the change in instability index is a ratio of the instability index in a current time segment to the instability index in a preceding time segment, and
wherein the controller corrects the instability index in accordance with the change in the instability index and a correction coefficient, and causes the corrected index to be displayed on the display unit as the representation of the change.

4. The stability display apparatus according to claim 3, wherein the controller corrects the instability index and displays the corrected instability index after a delay time corresponding to a duration during which the instability index exceeding the upper limit has elapsed.

5. The stability display apparatus according to claim 2, wherein the controller corrects the instability index based on a duration during which the instability index exceeds the upper limit and the change in the instability index, and causes the corrected instability index to be displayed on the display unit.

6. The stability display apparatus according to claim 2, wherein the controller corrects the instability index based on a maximum value obtained when the instability index exceeds the upper limit and on the change in the instability index, and causes the corrected instability index to be displayed on the display unit.

7. The stability display apparatus according to claim 1, wherein the representation of the change is a shape in the display region of the display unit, the shape indicating a direction of the change in the instability index estimated by the instability estimation unit which is beyond the upper limit.

8. The stability display apparatus according to claim 1, wherein the indices can further include a steering entropy index and an acceleration range index.

* * * * *